(12) United States Patent
Veltman et al.

(10) Patent No.: US 8,798,167 B2
(45) Date of Patent: Aug. 5, 2014

(54) ENCODER AND ITS METHOD

(75) Inventors: Mark Veltman, Tokyo (JP); Yoichi Yagasaki, Tokyo (JP); Noriaki Oishi, Kanagawa (JP); Tadayuki Ishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1228 days.

(21) Appl. No.: 10/536,022

(22) PCT Filed: Nov. 28, 2003

(86) PCT No.: PCT/JP03/15257
§ 371 (c)(1),
(2), (4) Date: Jan. 19, 2006

(87) PCT Pub. No.: WO2004/052015
PCT Pub. Date: Jun. 17, 2004

(65) Prior Publication Data
US 2006/0133474 A1    Jun. 22, 2006

(30) Foreign Application Priority Data

Nov. 29, 2002    (JP) ................................ 2002-349287
Dec. 6, 2002    (JP) ................................ 2002-356054

(51) Int. Cl.
*H04N 7/18*    (2006.01)
*H04N 11/02*    (2006.01)
*H04N 11/04*    (2006.01)

(52) U.S. Cl.
USPC .................................. 375/240.26; 375/240.01

(58) Field of Classification Search
USPC ........................................ 375/240.01, 240.26
See application file for complete search history.

(56) References Cited

U.S. PATENT DOCUMENTS

| | | | | |
|---|---|---|---|---|
| 5,742,600 A | * | 4/1998 | Nishihara | 370/395.6 |
| 6,151,359 A | * | 11/2000 | Acer et al. | 375/240.28 |
| 6,282,240 B1 | * | 8/2001 | Fukunaga et al. | 375/240.01 |
| 2002/0054635 A1 | * | 5/2002 | Nagai et al. | 375/240.01 |
| 2005/0069039 A1 | * | 3/2005 | Crinon | 375/240.26 |

FOREIGN PATENT DOCUMENTS

| | | |
|---|---|---|
| JP | 7-87124 | 3/1995 |
| JP | 09-307891 | 11/1997 |
| JP | 11-262000 | 9/1999 |
| JP | 11-262001 | 9/1999 |
| JP | 11-355263 | 12/1999 |

(Continued)

OTHER PUBLICATIONS

Office Action issued May 10, 2011, in Japanese Patent Application No. 2009-114987.

(Continued)

*Primary Examiner* — Chikaodili E Anyikire
(74) *Attorney, Agent, or Firm* — Oblon, Spivak, McClelland, Maier & Neustadt, L.L.P.

(57) ABSTRACT

An encoding apparatus adds delay time information DTI indicating initial delay time i_d and delay time d of each group data to a position to be read prior to frame data by a decoding apparatus in the group data of encoding stream data DBI and transmits the same to the decoding apparatus 3. Namely, the encoding apparatus does not transmit initial offset delay time i_of to the decoding apparatus 3. The encoding apparatus starts to read and transmit the encoding stream data DBI from a transmission buffer at a predetermined bit rate R at timing designated by the initial offset delay time i_of.

4 Claims, 7 Drawing Sheets

(56) References Cited

FOREIGN PATENT DOCUMENTS

| WO | WO 97/38532 | 10/1997 |
| WO | WO 01/80570 A2 | 10/2001 |
| WO | WO 01/80570 A3 | 10/2001 |
| WO | WO 02/25951 A2 | 3/2002 |
| WO | WO 02/25951 A3 | 3/2002 |

OTHER PUBLICATIONS

Japanese Office Action issued Aug. 7, 2012, in Patent Application No. 2010-283673.

Japanese Office Action issued Aug. 7, 2012, in Patent Application No. 2010-283674.

Office Action issued on Dec. 17, 2013 in Japanese Patent Application No. 2012-274914.

Natan Peterfreund, "Time—Shift Causality Constraint on the CAT-LB HRD", Joint Video Team (JVT) of ISO/IEC MPEG & ITU-T VCEG (ISO/IEC JTC1/SC29/WG11 and ITU-T SG16 Q.6), $5^{th}$ Meeting: Geneva, Switzerland, Oct. 9-17, 2002, [JVT-E133r2].

Extended Search Report issued Jan. 16, 2013 in European Patent Application No. 12184984.8.

Extended Search Report issued Jan. 16, 2013 in European Patent Application No. 12184978.0.

Extended Search Report issued Jan. 16, 2013 in European Patent Application No. 12184992.1.

Extended Search Report issued Jan. 16, 2013 in European Patent Application No. 12184986.3.

Office Action issued Oct. 30, 2012 in Japanese Patent Application No. 2010-283674.

\* cited by examiner

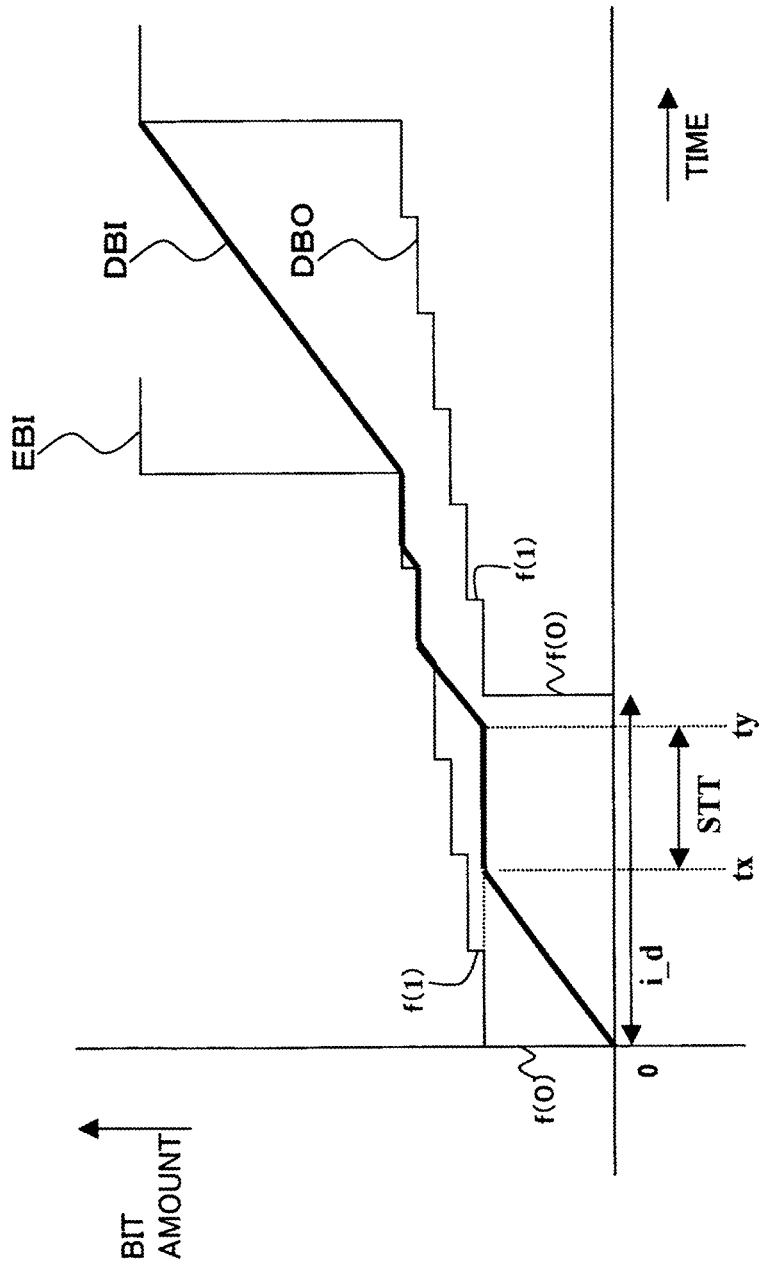

ENCODER AND ITS METHOD

TECHNICAL FIELD

The present invention relates to an encoding apparatus and the method having a characteristic in a method of managing buffers.

BACKGROUND ART

There are systems for providing content data, such as encoded video data and audio data, by transmitting to decoding apparatuses via a network, etc.

An encoding apparatus of such systems writes encoded data to a transmission buffer and, after a predetermined initial offset delay time, reads the content data from the transmission buffer so as to transmit to an encoding apparatus.

On the other hand, it starts by decoding.

A control circuit 11 suspends reading of encoding stream data DBI from a transmission buffer E_BUF until timing ti(3) that frame data f(3) is written to the transmission buffer E_BUF, when a data amount stored in the transmission buffer E_BUF becomes 0 at timing te(2) shown in FIG. 2.

Also, the control circuit 11 adds to the content data delay time information indicating an overflow and underflow, initial delay time until starting of the reading, and timing of reading respective frame data composing the content data from a receiving buffer and transmits the same to a receiving buffer D_BUF of a decoding apparatus 3.

A conventional encoding apparatus designates the above initial delay time by assuming that starting timing of the above initial offset delay time is 0. Therefore, the encoding apparatus adds the initial offset delay time information other than the above delay time information to the content data and transmits the same to the decoding apparatus.

However, in the above conventional system, since the initial offset delay time information is added to the content data, there is a problem that a step for the adding processing arises and a load on processing of the encoding apparatus is heavy.

Also, by adding the initial offset delay time information, there is a problem that an information amount of the content data becomes large.

The present invention was made in consideration of the above related arts and has as an object thereof to provide an encoding apparatus and the method capable of reducing a processing load on the encoding apparatus and reducing a communication amount at a time.

Also, an object of the present invention is to provide an encoding apparatus and the method capable of reducing a memory capacity required by a memory means for decoding.

DISCLOSURE OF THE INVENTION

To attain the above object, a first aspect of the invention is an encoding apparatus, including an encoder for generating a plurality of encoding data to be decoded in a predetermined order, a memory for storing the encoding data generated by the encoder, and a control for reading the encoding data from the memory and transmitting to a decoding destination; wherein the control determines a first delay time from writing the encoding data being first on the decoding order among the plurality of encoding data generated by the encoder until reading and transmitting the same to the decoding destination, determines a second delay time from receiving the encoding data being first on the decoding order among the plurality of encoding data at the decoding destination to decoding of the first encoding data, transmits delay time information indicating the second delay time to the decoding destination, and transmits the first encoding data being first on the decoding order to the decoding destination based on the determined first delay time.

Further, a second aspect of the invention is an encoding apparatus, including an encoder for generating a plurality of encoding data to be decoded in a predetermined order, a memory for storing the encoding data generated by the encoder, and a control for transmitting the encoding data read from the memory together with information for designating timing of decoding the encoding data at a decoding destination to the decoding destination; wherein the control suspends reading of the encoding data from the memory before a data amount of the encoding data stored in the memory becomes 0 and, after a predetermined suspension period, reads the encoding data from the memory to resume an operation of transmitting to the decoding destination.

Further, a third aspect of the invention is an encoding method, including first determining a first delay time from writing encoding data being first on the decoding order among a plurality of encoding data to a memory until reading and transmitting the same to a decoding destination, second determining a second delay time from receiving the first encoding data among the plurality of encoding data at the decoding destination until decoding of the first encoding data, and a transmitting delay time information indicating the second delay time determined in the second determining to the decoding destination and transmitting the first encoding data on the decoding order to the decoding destination based on the first delay time determined in the first determining.

Further, a fourth aspect of the present invention is an encoding method, including writing a plurality of encoding data to be decoded in a predetermined order to a memory, and reading the encoding data from the memory together with information for designating timing of decoding the encoding data at a decoding destination and transmitting the same to the decoding destination; wherein the reading suspends reading of the encoding data from the memory before a data amount of the encoding data stored in the memory becomes 0 and, after a predetermined suspension period, resumes reading of the encoding data from the memory.

BRIEF DESCRIPTION OF DRAWINGS

FIG. 7 is a view for explaining an operation of a control circuit of an encoding apparatus of a fourth embodiment of the present invention.

BEST MODE FOR CARRYING OUT THE INVENTION

Below, a communication system according to embodiments of the present invention will be explained.

Embodiment 1

Figure 1:
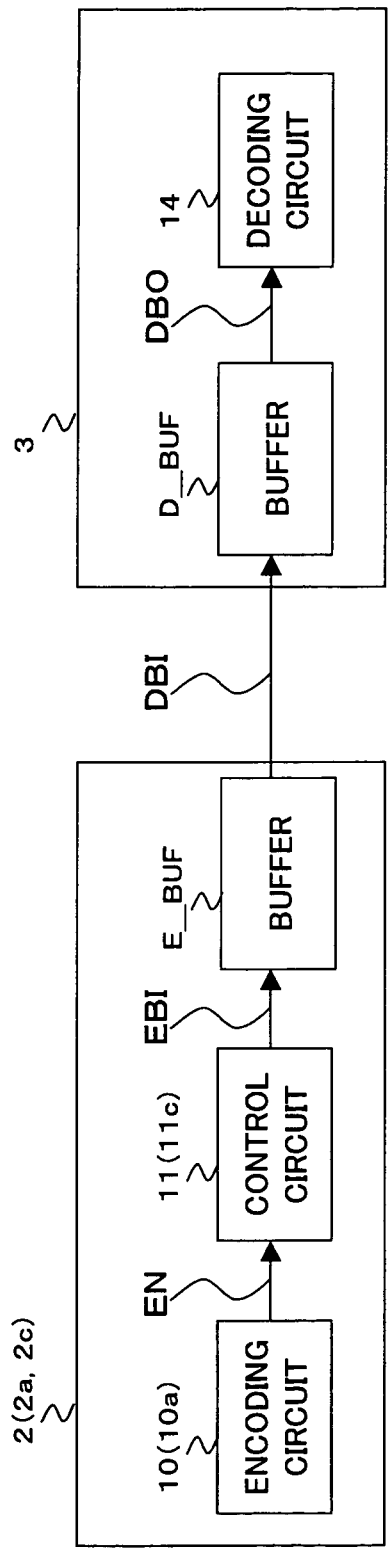
FIG. 1 is a view of the overall configuration of a communication system of a first embodiment of the present invention.

FIG. 1 is a view of the overall configuration of a communication system 1 of a first embodiment of the present invention.

As shown in FIG. 1, the communication system 1 comprises, for example, an encoding apparatus 2 and a decoding apparatus 3.

The encoding apparatus 2 corresponds to an encoding apparatus of a first invention, and the decoding apparatus 3 corresponds to a decoding destination of the present invention.

The encoding apparatus 2 generates encoding data DBI and transmits the same to the decoding apparatus 3 via a network.

[Encoding Apparatus 2]

As shown in FIG. 1, the encoding apparatus 2 comprises, for example, an encoding circuit 10, a control circuit 11 and a transmission buffer E_BUF.

Here, the encoding circuit 10 corresponds to an encoding means of the first invention, the control circuit 11 corresponds to a control means of the first invention, and the transmission buffer E_BUF corresponds to a memory means of the first invention.

The encoding circuit 10 generates, for example, encoded video data EN composed of a plurality of frame data and outputs the same to the control circuit 11.

The video data EN is composed of, for example, group data respectively including a plurality of frame data.

In the present embodiment, as an example, the group data of the video data EN is composed of 5 frame data f(0) to f(4).

The control circuit 11 writes as video data EBI the video data EN input from the encoding circuit 10 to the transmission buffer E_BUF.

Also, the control circuit 11 designates initial offset delay time i_of, initial delay time i_d and delay time d for each of the group data composing the video data EN.

The control circuit 11 reads the video data EBI as encoding stream data DBI from the transmission buffer E_BUF at timing designated by the initial offset delay time i_of and transmits the same to the decoding apparatus 3.

Figure 2:
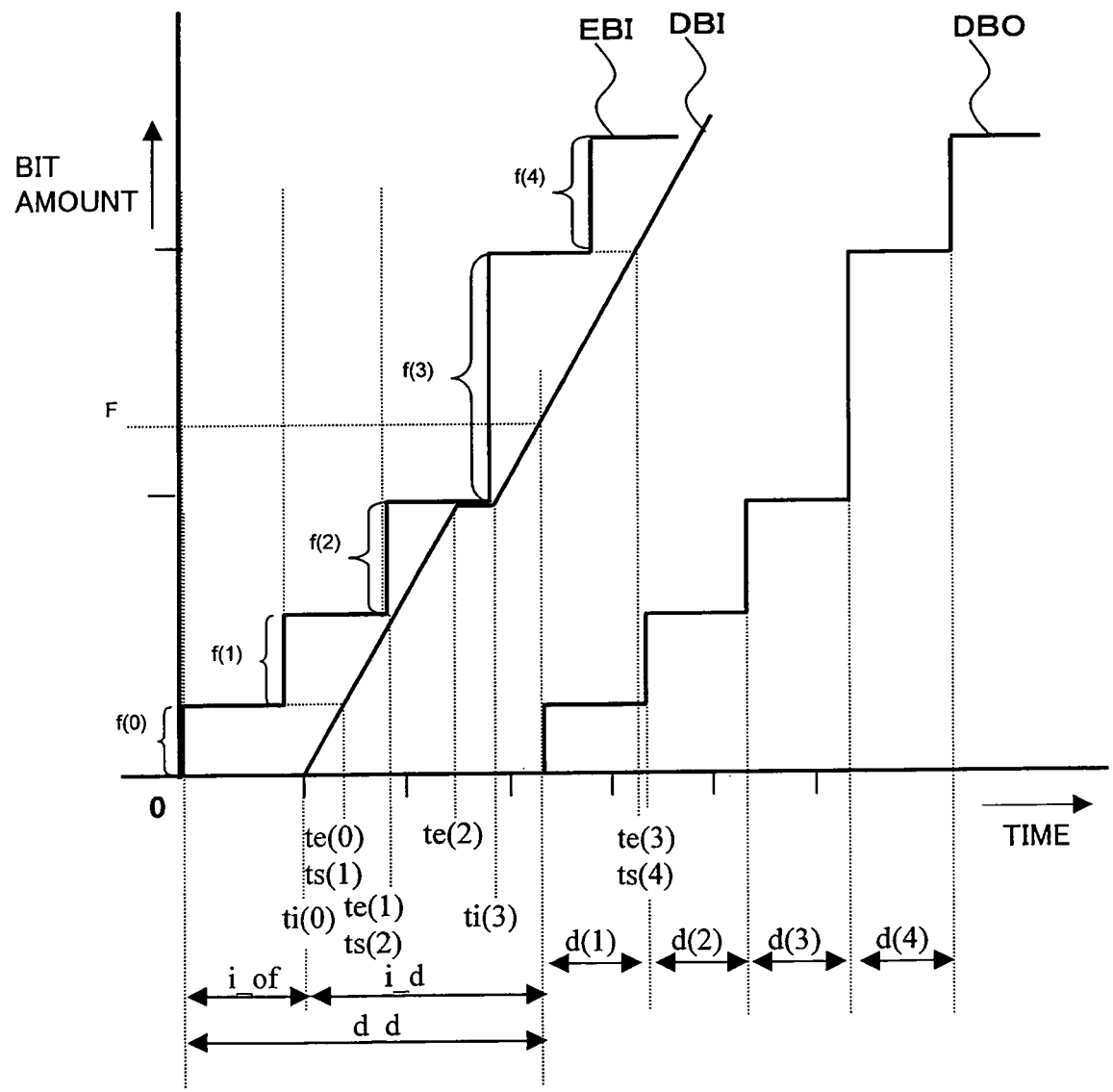
FIG. 2 is a view for explaining timing of video data EBI, encoding stream data DBI and video data DBO shown in FIG. 1.
Figure 3:
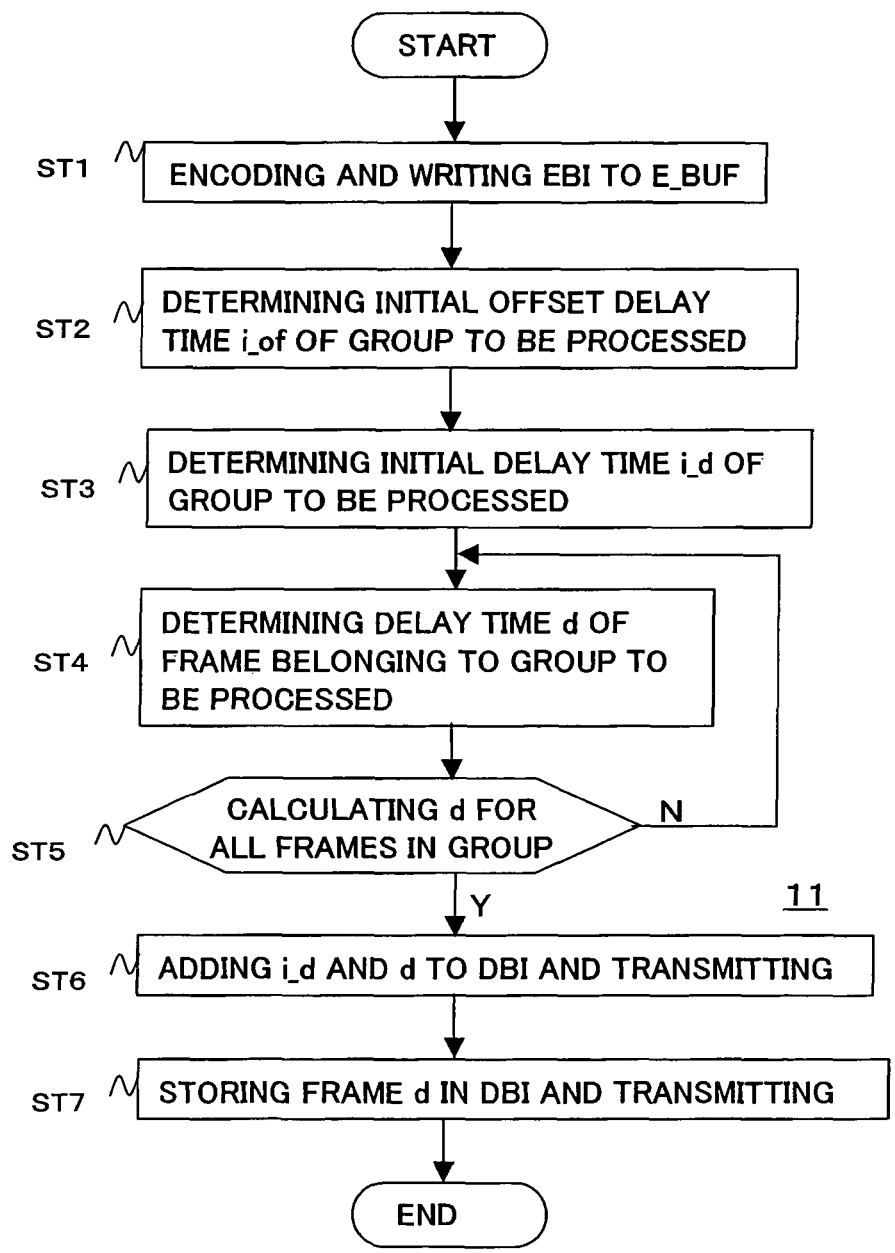
FIG. 3 is a flowchart for explaining an operation of a control circuit of the encoding apparatus shown in FIG. 1.

Also, the control circuit 11 generates delay time information DTI indicating initial delay time i_d and delay time d of each of the frame data in the group data, adds the same to a position to be read first by the decoding apparatus 3 in each group data, and transmits as encoding stream data DBI to the decoding apparatus 3 at timing shown in FIG. 2.

The initial delay time i_d indicates timing of reading the first frame data f(0) among the plurality of frame data belonging to the group data from the receiving buffer D_BUF of the decoding apparatus 3 to the decoding circuit 14. Here, in the present embodiment, the delay time i_d is designated by assuming that timing of starting an operation of writing the first frame data of the group data in the video data EBI to the transmission buffer E_BUF is 0 as shown in FIG. 2.

Also, delay time d(1) to d(4) indicate time from reading of previous frame data of the frame data in the decoding order from the receiving buffer D_BUF till reading of the frame data from the receiving buffer D_BUF for the plurality of frame data belonging to the group data.

The control circuit 11 adds the delay time information DTI indicating initial delay time i_d and delay time d of each of the group data to a position to be read prior to the frame data by the decoding apparatus 3 in the group data of the encoding stream data DBI and transmits the same to the decoding apparatus 3.

Namely, the control circuit 11 does not transmit the initial offset delay time i_of to the decoding apparatus 3.

The control circuit 11 starts reading of the encoding stream data DBI from the transmission buffer E_BUF at a predetermined bit rate R at timing designated by the initial offset delay time i_of as shown in FIG. 2.

Then, the control circuit 11 suspends reading of the encoding stream data DBI from the transmission buffer E_BUF until the timing ti(3) that the frame data f(3) is written to the transmission buffer E_BUF, when a data amount stored in the transmission buffer E_BUF becomes 0 at the timing te(2) shown in FIG. 2.

Also, the control circuit 11 considers burst characteristics of the encoding stream data DBI to determine at least one of frame data initial offset delay time i_of and initial delay time i_d so as not to cause an overflow and underflow in the receiving buffer D_BUF of the decoding apparatus 3.

Below, an operation example of the encoding apparatus 2 shown in FIG. 1 will be explained.

Step ST1:

The encoding circuit 10 generates, for example, encoded video data EN composed of a plurality of frame data and outputs the same to the control circuit 11.

The control circuit 11 writes as video data EBI shown in FIG. 2 the video data EN to the transmission buffer E_BUF.

Step ST2:

The control circuit 11 determines initial offset delay time i_of of group data to be processed composing the video data EBI.

Step ST3:

The control circuit 11 determines initial delay time i_d of the group data to be processed.

Step ST4:

The control circuit 11 determines delay time d of frame data belonging to the group data to be processed.

Step ST5:

The control circuit 11 determines whether delay time d is calculated for all frame data belonging to the group data to be processed and, when determined that the calculation is completed, proceeds to the step ST6, while when determined the calculation is not completed, performs processing of the step ST4 on yet to be calculated frame data.

Step ST6:

The control circuit 11 adds the delay time information DTI indicating the initial delay time i_d of the group data to be processed determined in the step ST3 and the delay time d of all frame data belonging to the group data to be processed determined in the step ST4 to a position to be read prior to the frame data by the decoding apparatus 3 in the group data of the encoding stream data DBI and transmits the same to the decoding apparatus 3.

Namely, the control circuit 11 does not transmit the initial offset delay time i_of to the decoding apparatus 3.

Step ST7:

The control circuit 11 reads the frame data belonging to the group data to be processed from the transmission buffer E_BUF based on the initial offset delay time i_of determined in the step ST2 and transmits the same as encoding stream data DBI to the decoding apparatus 3.

As explained above, according to the communication system 1, the encoding apparatus 2 does not store the initial offset delay time i_of in the delay time information DTI, so that an information amount to be transmitted from the encoding apparatus 2 to the decoding apparatus 3 can be reduced.

[Decoding Apparatus 3]

As shown in FIG. 1, the decoding apparatus 3 comprises, for example, a receiving buffer D_BUF and a decoding circuit 14.

The decoding apparatus 3 writes video data DBI received from the encoding apparatus 2 to the receiving buffer D_BUF.

In the present embodiment, timing of reading encoding stream data DBI from the transmission buffer E_BUF of the encoding apparatus 2 and timing of writing the same to the receiving buffer D_BUF of the decoding apparatus 3 are matched.

Based on the delay time information DTI of the respective group data included in the encoding stream data EBI, the decoding circuit 14 reads frame data belonging to the group data to be processed from the transmission buffer E_BUF as video data DBO and outputs to the decoding circuit 14.

Namely, the decoding circuit 14 starts reading of the first frame data f(0) of the above group data at timing designated by the initial delay time i_d in the delay time information DTI, then, reads frame data f(1) to (4) from the receiving buffer D_BUF based on the delay time d(1) to d(4).

In the present embodiment, since the initial delay time i_d is designated by assuming that timing of starting writing of encoding stream data DBI to the receiving buffer D_BUF is 0. the decoding apparatus 3 can specify timing of starting reading of the first frame data f(0) of the group data without using the initial offset delay time i_of.

The decoding circuit 14 decodes the video data DBO read from the receiving buffer D_BUF in unit of frame data.

Also, according to the communication system 1, as shown in FIG. 2, by designating the delay time i_d by assuming that timing of starting an operation of writing the first frame data of the group data in the video data EBI to the transmission buffer E_BUF is 0. the decoding apparatus 3 can specify timing of reading the first frame data f(0) in the group data of the encoding stream data from the receiving buffer D_BUF based on the delay time i_d indicated by the delay time information DTI.

Note that while the case of using single encoding apparatus 2 was explained as an example in FIG. 1, in the case of transmitting encoding stream data DBI from a plurality of encoding apparatuses 2 to single decoding apparatus 3, the decoding apparatus 3 may decode preferentially from those having shorter initial delay time i_of among a plurality of received encoding stream data DBI successively.

As a result, a highly responsive system can be realized.

Second Embodiment

Figure 4:
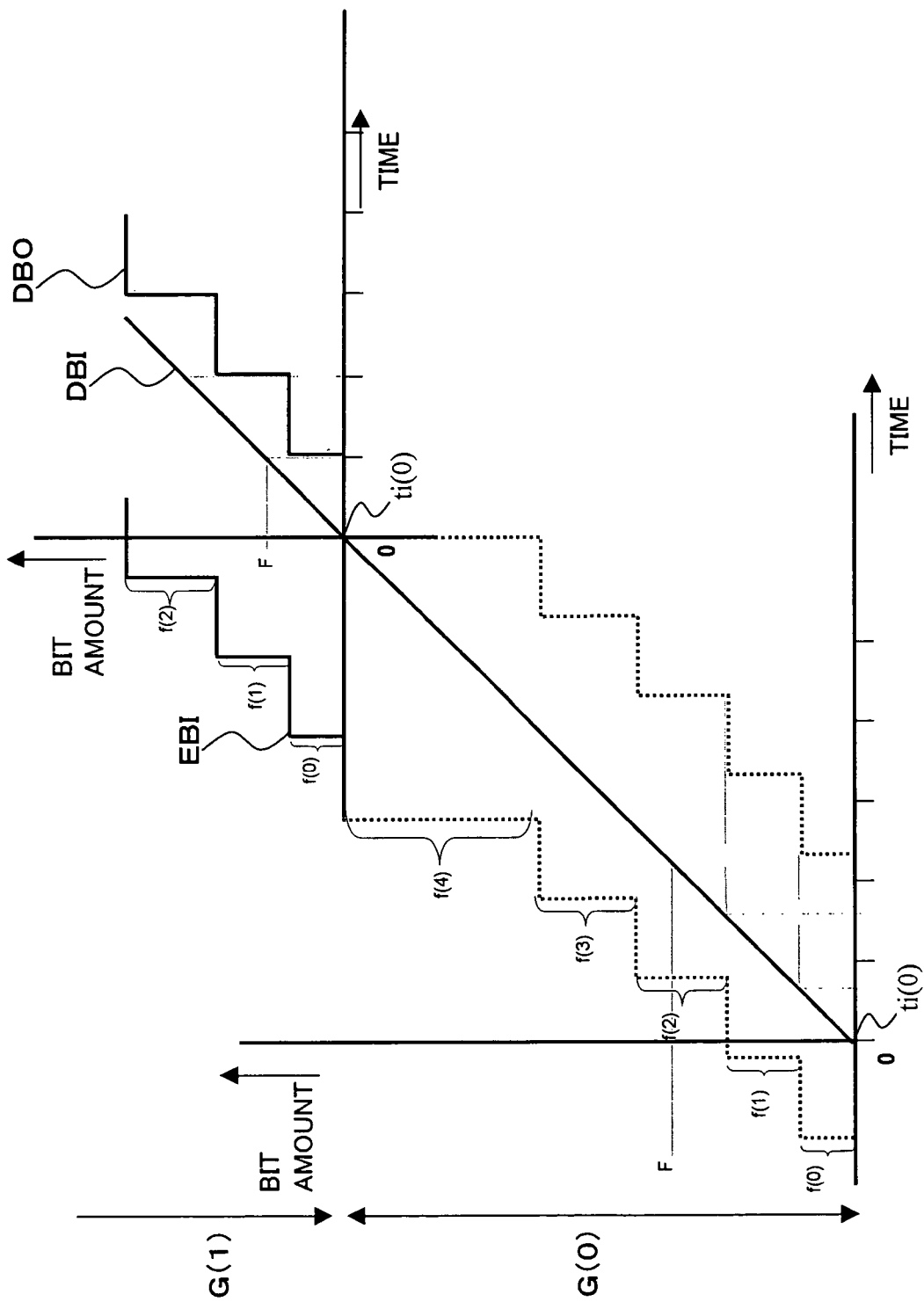
FIG. 4 is a view for explaining limitation of a conventional encoding apparatus.

For example, an encoding circuit 10 of the encoding apparatus 2 of the first embodiment explained above determines a data amount of the final frame data f(4) on the decoding order belonging to the group data G(0) to be processed at timing of starting writing to the receiving buffer D_BUF of the final frame data on the decoding order belonging to a sequential group data G(1) of the group data G(0) to be processed, as shown in FIG. 4, so that the frame data belonging to the group G(0) to be processed is all read from the receiving buffer D_BUF to the decoding circuit 14 (a data amount stored in the receiving buffer D_BUF becomes 0).

The encoding apparatus 2a in the present embodiment is the same as the encoding apparatus 2 in the first embodiment explained above except for the points below.

Figure 5:
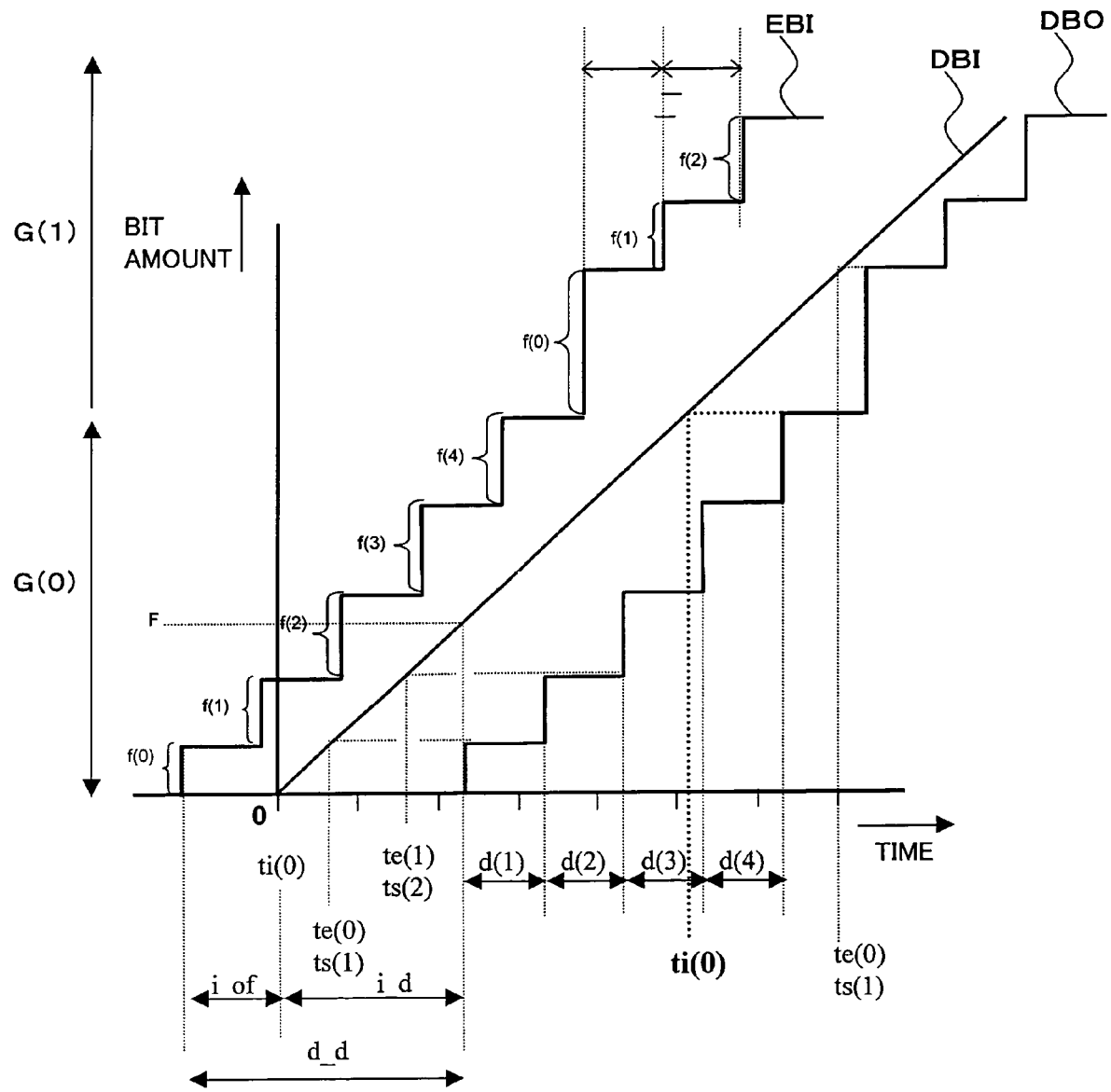
FIG. 5 is a view for explaining an operation of a control circuit of an encoding apparatus of a second embodiment of the present invention.

Namely, the encoding circuit 10a of the encoding apparatus 2a of the present embodiment determines a data amount of the final frame data f(4) on the decoding order belonging to the group data G(0) to be processed, for example as shown in FIG. 5, without the limitation that all frame data belonging to the group G(0) to be processed is read from the receiving buffer D_BUF to the decoding circuit 14 at timing of starting writing to the receiving buffer D_BUF of the first frame data f(0) on the decoding order belonging to the sequential group data G(1) of the group data G(0) to be processed.

Therefore, in the present embodiment, there are some cases where frame data belonging to the group G(0) to be processed remains in the receiving buffer D_BUF at timing of starting to write to the receiving buffer D_BUF of the first frame data f(0) on the decoding order belonging to the sequential group data G(1) of the group data G(0) to be processed.

As a result, the encoding circuit 10a does not have to insert stuffing data (for example, "0" data), which is not written to the receiving buffer D_BUF and causes deterioration of picture quality, into frame data f(4) to be decoded last belonging to the group data G(0) to be processed. Consequently, picture quality of the decoded image in accordance with the frame data f(4) can be improved.

Third Embodiment

Figure 6:
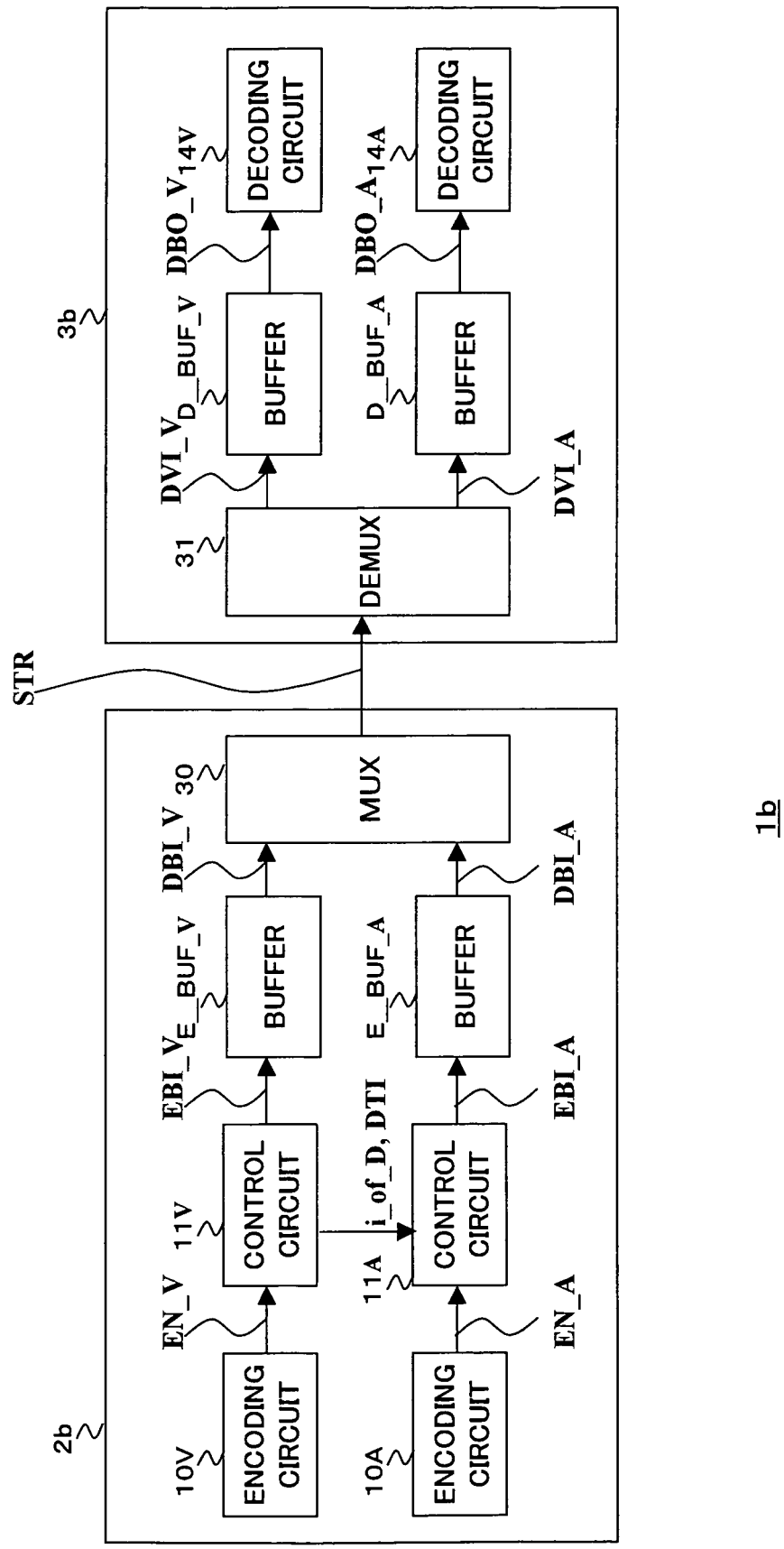
FIG. 6 is a view of the overall configuration of a communication system of a third embodiment of the present invention.

FIG. 6 is a view of the overall configuration of a communication system 1b of the present embodiment.

As shown in FIG. 6, the communication system 1b comprises, for example, an encoding apparatus 2b and a decoding apparatus 3b.

The encoding apparatus 2b multiplexes video data DBI_V and audio data DBI_A to generate encoding stream data STR and transmits the same to the decoding apparatus 3b.

The decoding apparatus 3b demultiplexes the video data DBI_V and the audio data DBI_A from the encoding stream data STR and decodes them, respectively.

[Encoding Apparatus 2]

As shown in FIG. 6, the encoding apparatus 2 comprises, for example, an encoding circuit 10V, a control circuit 11V, a transmission buffer E_BUF_V, encoding circuit 10A, a control circuit 11A, a transmission buffer E_BUF_A and a multiplexing circuit 30 (MUX).

The encoding circuit 10V and the transmission buffer E_BUF_V are the same as the encoding circuit 10 and the transmission buffer E_BUF shown in FIG. 1 explained in the first embodiment, respectively.

Here, video data EN_V corresponds to the video data EN in the first embodiment, video data EBI_V corresponds to the video data EBI in the first embodiment, and encoding stream data DBI_V corresponds to the encoding stream data DBI in the first-embodiment.

The encoding circuit 10A generates encoded audio data EV_A.

The control circuit 11A and the transmission buffer E_BUF_A operate on audio data in the same way as operations of the control circuit 11 and the transmission buffer E_BUF on video data in the first embodiment.

In the present embodiment, the control circuit 11V, in addition to the operation of the encoding circuit 10 in the first embodiment, outputs information i_of_D indicating initial offset delay time i_of to the control circuit 11A.

Also, the encoding circuit 11V outputs delay time information DTI indicating initial delay time i_d and delay time d of respective frame data in the group data to the control circuit 11A.

The control circuit 11A determines initial offset delay time i_of_A of video data audio data DBI_A, so that video encoding stream data DBI_V and audio encoding stream data DBI_A are synchronized based on the initial offset delay time i_of indicated by the information i_of_D input from the control circuit 11V.

Then, the control circuit 11A reads from the transmission buffer E_BUF_A frame data at the top of the group data in the encoding stream data DBI_A based on the initial offset delay time i_of_A determined above, and outputs to the multiplexing circuit 30.

Also, the control circuit 11A generates audio delay time DTI_A (initial delay time i_d_A) based on the video delay time DTI (initial delay time i_d) input from the control circuit 11V and adds the same to the encoding stream data DBI_A.

Also, the control circuits 11A and 11V may determine the transfer bit rate of the encoding stream data DBI_V and DBI_A, so that the encoding stream data DBI_V and DBI_A are synchronized.

Also, the control circuit 11A may determine a memory capacity required to store the encoding stream data DVI_A to the receiving buffer D_BUF_A of the decoding apparatus 3b based on at least one of the initial offset delay time i_of_A and video delay time DTI input from the control circuit 11V, add information indicating the memory capacity and output to the multiplexing circuit 30.

The multiplexing circuit 30 multiplexes the video encoding stream data DBI_V input from the transmission buffer E_BUF_V and audio encoding stream data DBI_A input from the transmission buffer E_BUF_A to generate encoding stream data STR, and transmits the same to the decoding apparatus 3b.

[Decoding Apparatus 3b]

As shown in FIG. 6, the decoding apparatus 3b comprises, for example, a demultiplexing circuit 31, a receiving buffer D_BUF_V, a decoding circuit 14V, a receiving buffer D_BUF_A and a decoding circuit 14A.

A frame memory 31 demultiplexes the encoding stream data DBI_V and DVI_A from the encoding stream data STR, writes the encoding stream data DBI_V to the receiving buffer D_BUF_V, and writes the encoding stream data DBI_A to the receiving buffer D_BUF_A.

Here, the decoding circuit 14V reads from the receiving buffer D_BUF_V video data DBO_V based on the delay time information DTI stored in the encoding stream data DVI_V and decodes the same.

Also, the decoding circuit 14A reads from the receiving buffer D_BUF_A audio data DBO_A based on the delay time information DTI_A stored in the encoding stream data DVI_A and decodes the same.

As explained above, according to the communication system 1b of the present embodiment, even in the case of multiplexing video and audio for transmitting, the same effects as those in the first embodiment can be obtained.

Also, according to the encoding apparatus 2b, by providing information i_of_D indicating initial offset delay time i_of generated by the control circuit 11V and the delay time information DTI to the control circuit 11A, video and audio can be synchronized.

Fourth Embodiment

The encoding apparatus 2c of the present embodiment is the same as the encoding apparatus 2 in the first embodiment shown in FIG. 1 except for a part of processing of the control circuit 11.

Below, different processing of the control circuit 11c of the encoding apparatus 2c of the present embodiment from that of the control circuit 11 will be explained.

FIG. 7 is a view for explaining timing of encoding stream data DBI designated by the control circuit 11c of the present embodiment.

As shown in FIG. 7, the control circuit 11c suspends an operation of transmitting the encoding stream data DBI to the decoding apparatus 3 before a data amount of frame data stored in the receiving buffer D_BUF becomes 0 and, after a predetermined suspension period STT, resumes transmission of the encoding stream data DBI to the decoding apparatus 3.

Specifically, the control circuit 11c starts to read the first frame data f(0) on the decoding order in the group data at reference timing "0" as shown in FIG. 7 and, when coming to timing tx that the reading is completed, suspends transmission of the encoding stream data DBI (a reading operation from the transmission buffer E_BUF).

Then, the control circuit 11c resumes transmission of the encoding stream data DBI at timing ty after a predetermined suspension period STT.

In the present embodiment, the timing ty is designated as timing immediately before starting to decode the first frame data f(0) in the above group data in the decoding circuit 14 of the decoding apparatus 3.

As explained above, according to the encoding apparatus 2c, by designating the timing of the encoding stream data DBI as shown in FIG. 7, a memory capacity required by the receiving buffer D_BUF of the decoding apparatus can be reduced.

Industrial Applicability

The present invention can be applied to an encoding system for managing buffers.

The invention claimed is:

1. An encoding apparatus, comprising:
means for generating at least one group of encoded data including a plurality of encoded data frames to be decoded in a predetermined order;
means for determining a first delay time period between a time that a first of the encoded data frames to be decoded is stored in a means for storing the encoded data frames at said encoding apparatus to a time that the first of the encoded data frames is to be read from said means for storing;
means for determining a second delay time period between a time that the first of the encoded data frames is to be stored to said means for storing at said encoding apparatus to a time that a decoder of a decoding destination is to read the first of the encoded data frames from a means for storing encoded data at said decoding destination and decode the first of the encoded data frames;
means for reading the encoded data frames from said means for storing;
means for transmitting the encoded data frames and the determined second delay time period to said decoding destination;
means for suspending transmission of all of the encoded data frames and the determined second delay time period for a predetermined suspension period; and
means for resuming transmission of all of the of the encoded data frames and the determined second delay time period after the predetermined suspension period, wherein
said means for determining a second delay time period determines the second delay time period based on a time at which said means for reading reads the first of the encoded data frames from said means for storing at said encoding apparatus, as a reference timing.

2. The encoding apparatus as set forth in claim 1, wherein said means for determining a second delay time period determines the second delay time period by assuming that the reference timing is 0.

3. An encoding method, comprising:

generating at least one group of encoded data including a plurality of encoded data frames to be decoded in a predetermined order;

determining a first delay time period between a time that a first of the encoded data frames to be decoded is stored in a memory at an encoding apparatus to a time that the first of the encoded data frames is to be read from said memory;

determining a second delay time period between a time that the first of the encoded data frames is to be stored to said memory at said encoding apparatus to a time that a decoder of a decoding destination is to read the first of the encoded data frames from a memory of said decoding destination and decode the first of the encoded data frames;

reading the encoded data frames from said memory;

transmitting the encoded data frames and the determined second delay time period to said decoding destination;

suspending transmission of the encoded data frames and the determined second delay time period for a predetermined suspension period; and resuming transmission of the of the encoded data frames and the determined second delay time period after the predetermined suspension period, wherein the second delay time period is determined based on a time at which the first of the encoded data frames is read from said memory at said encoding apparatus, as a reference timing.

4. An encoding apparatus, comprising:

circuitry configured to:

generate at least one group of encoded data including a plurality of encoded data frames to be decoded in a predetermined order, determine a first delay time period between a time that a first of the encoded data frames to be decoded is stored in a storage unit at said encoding apparatus to a time that the first of the encoded data frames is to be read from said storage unit, determine a second delay time period between a time that the first of the encoded data frames is to be stored to said storage unit at said encoding apparatus to a time that a decoder of a decoding destination is to read the first of the encoded data frames from a memory of said decoding destination and decode the first of the encoded data frames, read the encoded data frames from said storage unit, transmit the encoded data frames and the determined second delay time period to said decoding destination, suspend transmission of the encoded data frames and the determined second delay time period for a predetermined suspension period, and resume transmission of the of the encoded data frames and the determined second delay time period after the predetermined suspension period, wherein the second delay time period is determined based on a time at which the first of the encoded data frames is read from said storage unit at said encoding apparatus, as a reference timing.

* * * * *